US006953653B2

(12) United States Patent  
Smith et al.

(10) Patent No.: US 6,953,653 B2  
(45) Date of Patent: Oct. 11, 2005

(54) FLUOROPOLYMER COMPOSITIONS, OPTICAL DEVICES, AND METHODS FOR FABRICATING OPTICAL DEVICES

(75) Inventors: Dennis W. Smith, Seneca, SC (US); John Ballato, Central, SC (US); Stephen Foulger, Clemson, SC (US); Suresh Kumar Manthati, College Station, TX (US)

(73) Assignee: Clemson University, Clemson, SC (US)

( * ) Notice: Subject to any disclaimer, the term of this patent is extended or adjusted under 35 U.S.C. 154(b) by 398 days.

(21) Appl. No.: 09/943,644

(22) Filed: Aug. 30, 2001

(65) Prior Publication Data

US 2004/0033047 A1 Feb. 19, 2004

(51) Int. Cl.[7] .............................. G02B 6/10; C08G 10/02
(52) U.S. Cl. ....................... 430/321; 385/143; 385/130; 385/131
(58) Field of Search ......................... 430/321; 385/143, 385/130, 131; 528/247, 334

(56) References Cited

U.S. PATENT DOCUMENTS

| 3,397,191 A | 8/1968 | Beckerbauer |
| 4,663,230 A | 5/1987 | Tennent |
| 5,006,285 A | 4/1991 | Thackara et al. |

(Continued)

FOREIGN PATENT DOCUMENTS

| WO | WO 9015043 A2 | 12/1990 |
| WO | WO 9015082 A1 | 12/1990 |

OTHER PUBLICATIONS

R. Traiphol, H. Shah, D.W. Smith, Jr. and D. Perahia, Bulk and Interfacial Studies of a New and Versatile Semifluorinated Lyotrophic Liquid Crystalline Polymer, Macromolecules 2000 34 3954–3961, pp. 3954–3961 Published on Web May, 5, 2001.

Dennis, W. Smith, Jr., David A. Babb, Hiren V. Shah, Adrienne Hoeglund, R. Traiphol, Dvora Perahia, Harold W. Boone, Chareles Langhoff, Mike Radler Perfluorocyclobutane (PECB) polyaryl ethers versatile coatings materials, Journal of Fluorine Chemistry 104 (2000) 109–117, Elsevier.

Byung–Tak Lee, Min–Suk Kwon, Jun–Bo Yoon, and Sang–Yung Shin, Fabrication of Polymeric Large–Core Waveguides for Optical Interconnects Using a Rubber Molding Process, IEEE Photonics Technology Letters, vol. 12 No. 1, Jan. 2000, pp. 62–64.

(Continued)

Primary Examiner—Martin Angebranndt  
(74) Attorney, Agent, or Firm—Dority & Manning, P.A.

(57) ABSTRACT

Optical waveguides interconnect optical information processing devices, or connect such devices with other optical communication links such as glass optical fibers. Fluoropolymers consisting of alternating perfluorocyclobutane and aryl ether linkages possess suitable properties for optical waveguides and other devices due to tunability in optical properties of the copolymers. Perfluorocyclobutane (PFCB) copolymer may be employed in solutions that exhibit a high solids content. Such solutions show useful physical properties for optical waveguide devices since the solutions are capable of achieving single step film thicknesses, when applied to a substrate, of greater than about 0.6 microns, and sometimes may achieve a thickness of 10 microns or more.

19 Claims, 6 Drawing Sheets

REFRACTIVE INDEX VS. INDICATED COPOLYMER COMPOSITIONS AT 633 AND 1550 nm

U.S. PATENT DOCUMENTS

| | | |
|---|---|---|
| 5,007,696 A | 4/1991 | Thackara et al. |
| 5,021,602 A | 6/1991 | Clement et al. |
| 5,023,380 A | 6/1991 | Babb et al. |
| 5,037,917 A | 8/1991 | Babb et al. |
| 5,037,918 A | 8/1991 | Babb |
| 5,037,919 A | 8/1991 | Clement et al. |
| 5,066,746 A | 11/1991 | Clement et al. |
| 5,159,036 A | 10/1992 | Babb |
| 5,159,037 A | 10/1992 | Clement et al. |
| 5,159,038 A | 10/1992 | Babb et al. |
| 5,162,468 A | 11/1992 | Babb et al. |
| 5,198,513 A | 3/1993 | Clement et al. |
| 5,210,265 A | 5/1993 | Clement et al. |
| 5,246,782 A | 9/1993 | Kennedy et al. |
| 5,426,164 A | 6/1995 | Babb et al. |
| 5,627,140 A | 5/1997 | Fossheim et al. |
| 5,730,922 A * | 3/1998 | Babb et al. ................ 264/258 |
| 5,850,498 A | 12/1998 | Schecklette et al. |
| 5,965,237 A | 10/1999 | Bruin et al. |
| 6,031,945 A | 2/2000 | You et al. |
| 6,037,105 A | 3/2000 | You et al. |
| 6,039,897 A | 3/2000 | Lochhead et al. |
| 6,052,238 A | 4/2000 | Ebbesen et al. |
| 6,124,365 A | 9/2000 | Lan et al. |
| 6,126,734 A | 10/2000 | Beall et al. |
| 6,203,814 B1 | 3/2001 | Fisher et al. |
| 6,210,867 B1 | 4/2001 | You et al. |
| 6,268,532 B1 | 7/2001 | DesMarteau et al. |
| 6,331,265 B1 | 12/2001 | Dupire et al. |
| 6,395,386 B2 | 5/2002 | Bagrodia et al. |
| 6,407,155 B1 | 6/2002 | Qian et al. |
| 6,414,070 B1 | 7/2002 | Kausch et al. |
| 6,438,307 B1 * | 8/2002 | Kaneko et al. ............. 385/131 |

OTHER PUBLICATIONS

U. Siebel, R. Hauffe, and K. Petermann, Crosstalk–Enhanced Polymer Digital Optical Switch Basd on a W–Shape, IEEE Photonics Technology Letters, vol. 12 No. 1, Jan. 2000 pp. 40–41.

Min–Cheol Oh, Myung–Hyun Lee, Hyung–Jong Lee, Polymeric Waveguide Polarization Splitter with a Buried Birefringent Polymer, IEEE Photonics Technology Letters vol 11 No 9 Sep. 1999 pp. 1144–1146.

G. Fischbeck, R. Moosburger, C. Kostrzews, A. Achen, K. Petermann, Singlemode optical waveguides using a high temperature stable polymer with low losses in the 1 55 um range Electronics Letters Mar. 13, 1997 vol 33 No 6 pp. 518–519.

D.W. Smith, Jr., H.W. Boone, R. Traiphol, H. Shah, D. Perahia, Perfluorocyclobutyl Liquid Crystalline Fluoropolymers. Syhtnesis and Thermal Cyclopolymerization of Ris-(trifluorovinyloxy)–a–methylstilbene Macromolecules vol. 33, No. 4, pp. 1126–1128.

David A. Babb, Katherine S. Clement, W. Frank Richey, Polymeric Materials Encyclopedia, Perfluorocyclobutane Aromatic Ether Polymers, Dow Chemical Co., 1995, pp. 4911–4920.

H. Shah, A. Hoeglund, M. Radler, C. Langhoff, D.W. Smith, Jr., Perfluorocyclobutane (PFCB) Polymers for Optical Fibers and Dielectric Waveguides, Polymer Preprints (Am Chem Soc Div Poly Chem ) 1999 40(2) 1293–1294.

Natalie Stutsmann, Theo A. Tervoort, Cees W. M. Bastiaansen, Kirill Feldman, Paul Smith, Solid–State Replication of Relief Structures in Semicrystalline Polymers Advanced Materials 2000 12 No 8 Communications pp. 557–562.

Jeremiah D. Brown, Small Optics Offer Big Correction, Photonics Spectra, Jun. 2000, pp. 122–124.

A.B. Hoeglund, H.V. Shah, J. Ballato, C. Langhoff, S.F. Macha, P.A. Limbach, D.W. Smith, Jr., Random Perfluorocyclobutyl Copolymers with Controlled Optical Properties, Polymer Preprints 2000, 41(2), xxxx, to be published in Aug. 2000.

A related application is pending which is U.S. Appl. No. 09/604,748 (CXU–326) for "Fluoropolymers and Methods of Applying Fluoropolymers in Molding Processes", filed Jun. 27 2000 naming Dr Smith et al inventors (copy enclosed).

Smith, et al., U.S. Appl. No. 10/196,724 filed Jul. 16, 2002, entitled "Diffraction of Devices And Methods," Ref. CXU–326–DIV1.

Smith, et al. U.S. Appl. No. 10/213,763 filed Aug. 7, 2002, entitled "Random Copolymer Compsotions," Ref. CXU–.

David A. Babb et al., Perfluorocyclobutane Aromataic Ether Polymers. III. Synthesis and Thermal Stability of a Thermoset Polymer Containing Triphenylphosphine Oxide, 2005–2012, Journal of Applied Polymer Science, vol. 69, 1998, XP002179956.

Louay, Eldada, Advances in Polymer Integrated Optics, pp. 54–68, IEEE Journal of Selectec Topics in Quantum Electronics, vol. 6, No. 1, Jan./Feb. 2000.

Salamone, Joseph C., Perfluorocyclobutane Aromatic Ether Polymers, pp. 4911–4920, Dow Chemical Co. 1995, Polymeric Materials Encyclopedia, vol. 7.

D.W. Smith, Jr., David A. Babb, Hiren V. Shah, Adrienne Hoeglund, R. Traiphol, Dvora Perahia, Harold W. Boone, Charles Langhoff, Mike Radler, Perfluorocyclobutane (PFCB) polyaryl ethers: versatile coatings materials, pp. 1–9, 2000 Elsevier Science S.A.

Database CA 'Online ! Chemical Abstracts Service, Columbis, Ohio, retrieved from STN Database accession No. 132:152543 XP002179957 abstract & Polym. Prepr., vol. 40, No. 2, 1999, pp. 1293–1294.

Robinson, Gilbert C., "A Primer On Efflorescence". Talk Presented at The American Ceramic Society Convention, May 1995.

Shah, Czerw, Carroll, Goldner, Hwang, Ballato, Smith, Jr., Fluoropolymer Nanotube Composites for Coatings and Nanoscopic Probes, p. 300. Clemson University, Clemson, South Carolina, presented Mar. 30, 2000.

Foulger, "Reduction Percolation Thresholds of Immiscible Conductive Blends", pp. 1899–1910, Journal of Polymer Science: Part B: Polymer Physics, vol. 37, 1999.

Hafner, Cheung, Lieber, "Growth of Nanotubes for Probe Microscopy Tips," Nature, Vo. 398, Apr. 29, 1999, pp. 761–762.

Ajayan, "Nanotube from Carbon," Chem, Rev. 1999, 99, pp. 1787–1799.

Article—*Novel Step–Growth Polymers from the Thermal [2π + 2π]Cyclopolymerization of Aryl Trifluorovinyl Ether Monomers*, David A. Babb, R. Vernon Snelgrove, Dennis W. Smith, Jr., and Scott F. Mudrich, American Chemical Society, 1996, pp. 431–441.

* cited by examiner

SPIN COATED FILM THICKNESS AT 600 RPM VS. WT.% COPOLYMER IN MESITYLENE FOR COPOLYMER OF SPECIES OF FIGURE 2A/2B

FLUOROPOLYMER COMPOSITIONS, OPTICAL DEVICES, AND METHODS FOR FABRICATING OPTICAL DEVICES

CROSS REFERENCE TO RELATED APPLICATIONS

This application is related to U.S. Ser. No. 09/604,748, which is a regular U.S. utility patent application filed Jun. 27, 2000.

FIELD OF THE INVENTION

This invention relates to the use of fluoropolymers and methods of applying fluoropolymers in making components for optical applications. In particular, the invention relates to perfluorocyclobutyl-based compositions.

BACKGROUND OF THE INVENTION

Optical waveguides interconnect optical information processing devices, or connect such devices with other optical communication links such as glass optical fibers. Waveguides may be used to create passive optical devices such as splitters, combiners, couplers, routers and the like. In commonly used planar applications, waveguides are densely packed on substrates.

An optical waveguide typically comprises a transparent core that is capable of directing light signals therethrough, and a cladding comprising a material that affords a lower refractive index than the core material. Waveguides may be constructed as single monolithic structures lithographically provided on a substrate, or may comprise optical fibers.

In the electronics and optical fabrication technologies, optical interconnects have been used in backplane interconnections, board-to-board interconnections, clock distribution, and a variety of other applications. In particular, lithographic processes have been used because such processes are generally suitable for mass production.

The integration of polymeric materials in optics is an increasingly attractive alternative in devices such as switches, optical interconnects, splitters, and surface relief structures. As demand for band width and low cost integration has increased, polymers provide flexibility, high transparency and versatility in structure, and properties. In particular, fluoropolymers represent alternatives to current optical polymers due to their properties, such as low transmission loss (at 1300 and 1550 nm), low birefringence, good optical stability after thermal aging, and low moisture absorption. For example, fluoroacrylates developed by Allied Signal and others, Dupont's Teflon™ AF (tetrafluoroethylene and perfluorovinyl ether copolymer), Amoco's Ultradel™ (fluorinated polyimide) and Asahi's CYTOP™ (perfluorovinyl ether cyclopolymer) are fluoroplastics currently pursued for optical device manufacture. See, for example, Eldad, L; Schacklette, L. "Advances in Polymer Integrated Optics," *IEEE J. Quantum Electronics* 2000, 6(1), 54.

The use of a perfluorocyclobutyl-based homopolymer in an optical waveguide has been disclosed. See Fishbeck, G.: Moosbuerger, R.; Kostrzews, C.; Achen, A.; Petermann, K. *Electronic Letters* 1997, 33(6), 518. Also, the use of various perfluorocyclobutane (PFCB) homopolymers has been disclosed for various electronics and other applications. See for example, U.S. Pat. No. 5,159,038; U.S. Pat. No. 5,037,917 and related patents.

Several patents relate to optical devices and methods for constructing them. For example, U.S. Pat. No. 5,850,498 is directed to low stress optical waveguides. U.S. Pat. No. 6,210,867 B1 is directed to methods for fabricating low loss optical devices using a photoresist coated on a linear optical layer by a spin coating method. The photoresist is dipped into a developer fluid and baked, thereby forming a photoresist pattern defining specific areas upon which a metal layer is deposited. A vacuum deposition method such as sputtering, electron beam or thermal evaporation may be employed to deposit a metal substrate.

A pending U.S. patent application (U.S. Ser. No. 09/604, 748) which is commonly owned by the assignee of the present application, discloses optical flruopolymers and methods of applying fluoropolymers in molding processes. The application is directed to the use of alternating perfluorocyclobutane and aryl ether linkages that are adapted for micromolding polymeric films by replicating a pattern or image directly from a silicon master.

In the case of forming a polymer film using spin coating techniques, it is necessary to form a coating of sufficient thickness to manufacture a waveguide. Many polymers cannot be dissolved at solids content when spin coated to manufacture a suitable waveguide thickness. In many instances, it requires multiple coats of polymer to achieve the necessary thickness, which introduces added interface problems, and can be costly and time consuming.

It has been recognized in the industry that a need exists for a suitable polymeric material and process that affords appropriate optical properties when applied in an optical device. A polymer and process of applying the polymer that is capable of achieving a suitably thick coating on the device is needed. A polymeric composition that is capable of maintaining a suitable solids thickness in solvent, thereby affording a relatively thick coating, is desirable. A composition and method of application that employs a minimum amount of solvent, and a maximum solids content, is needed. Furthermore, polymeric compositions that exhibits low loss in the telecommunications wavelength and a compositionally controlled refractive index to match that of the silica optical fibers and other components would be desirable.

SUMMARY OF THE INVENTION

A method and solution for making an optical device is provided in the invention of the application. The method may include steps of: providing a perfluorocyclobutyl-based copolymer composition, coating the perfluorocyclobutyl-based copolymer composition upon a substrate to form a first film, and thermally curing the first film to form a thermoset film.

The invention comprises compositions that include fluoropolymers comprised of alternating perfluorocyclobutane and aryl ether linkages. These compositions possess the mechanical, thermal and structural properties and the desired optical clarity required for the manufacture of optical waveguides and the like. Chemical structures of some of the compositions that may be employed in the invention of the application are shown in the attached drawings.

In some applications of the invention, the fluoropolymer may be used and as an optical signal carrier in a structural polymer matrix composite. Such composites may provide fully integrated high-speed data transmission mediums with switching and routing capabilities. Thermoplastic and thermosetting polymers containing perfluorocyclobutane (PFCB) and arylene ether linkages provide high performance and a multi-functional polymer. PFCB segments may provide improved dielectric insulation, optical clarity in the visible and near infrared wavelengths, increased solubility, melt processability, large thermo-optic coefficient (-dn/dT), low birefringence, and other valuable properties.

Of course, the above groups may be substituted with other alkyl or haloalkyl or organic constituents on the one or more carbons, such as a carbon in the ring structure, and the above structures are provided by way of example and not by way of limitation. In some applications, a polymer is provided which is prepared from a trifluorovinyl aromatic ether (TVE). Trifluorovinyl aromatic ether monomer precursors are traditionally prepared in two high yielding steps from commercially available phenolic precursors such as, for example, tris (hydroxyphenyl) ethane, biphenol, bishydroxyphenyl fluorene, or other compounds. Partially inorganic monomers containing siloxane and phosphine oxide groups have also been synthesized using an intermediate strategy involving delivery of a TVE group intact via Grignard and organo-lithium chemistry.

Polymers with a wide range of mechanical, thermal and optical properties may be obtained using the above referenced chemistry. In particular, the refractive indices of the homopolymers or the co-polymers may be provided exactly as designed by careful regulation of monomer choice. Thus the refractive index at a given wavelength can be precisely controlled. The invention is capable of providing well defined cyclopolymerization mechanisms using PFCB to prepare polymers with tunable thermal and optical properties. For example, random amorphous co-polymers with variable refractive indices, glass transition temperatures, and long term thermal stability above 350 degrees C. may be prepared by correct choice of a co-monomer composition. Co-polymers may be prepared by simple melt mixing of variable composition monomer mixtures and heating under appropriate conditions. Using the invention, it is possible under some conditions to provide for precise control of refractive index by the choice of comonomer that is used. Thus, the thermal cyclopolymerization of aromatic trifluorovinyl ether monomers to perfluorocyclobutane polymers and co-polymers affords high temperature, low transmission loss, and variable refractive index for use in optical devices.

In one aspect of the invention, optical devices and a process for fabricating optical devices may include an optical waveguide constructed of a core region and a clad region. A lower clad layer is formed on a substrate with a refractive index that is less than that of the core regions.

In another aspect of the invention, a core and clad device structure is provided which exhibits a high thermo optic coefficient (-dn/dT) (refractive index change with temperature) for the manufacture of a thermo-optic switch.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

Poly-aryl ethers containing perfluorocyclobutyl (PFCB) linkages are viable candidates for optical and opto-electronic applications due in part to their wide range of complementary properties. The properties of such compounds include excellent thermal and thermo-oxidative stability, high $T_g$, low moisture absorption, low dielectric constant, variable refractive index, and desirable melt and solution processability. Furthermore, poly-aryl ethers containing PFCB linkages are among the few known optical polymers to possess low attenuations in the technologically important 1,550 and 1,300 nm region. And can be precisely index matched to silica optical fibers and exhibit a high thermo-optic coefficient.

Figure 1:
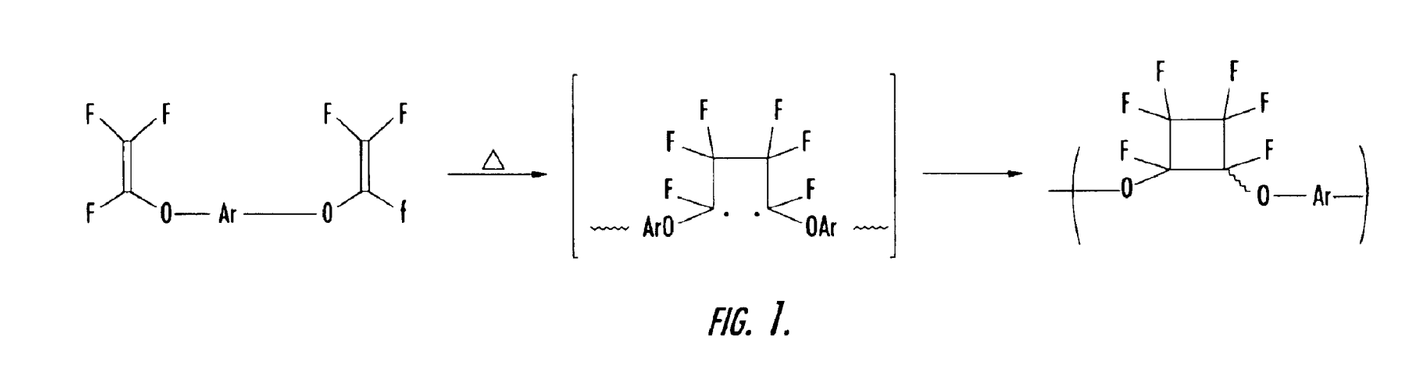
FIG. 1 shows the perfluorocyclobutane (PFCB) copolymer composition.
Figure 1A:
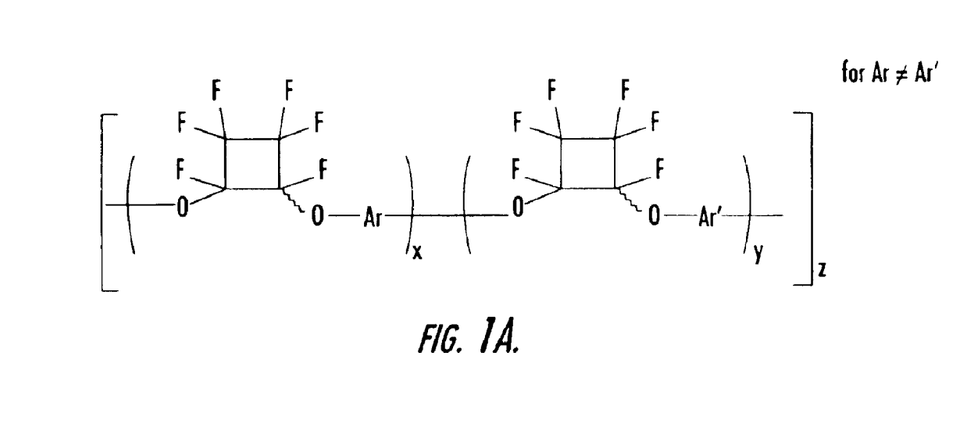
FIG. 1A shows the structure of the copolymer that may be formed and used in the practice of the invention.

PFCB polymers are prepared from trifluorovinyl aromatic ether monomers via a free radical mediated thermal co-polymerization mechanism as illustrated in FIG. 1. A representative example of some of the groups that may be included and used as the Ar and/or Ar' group as shown in FIG. 1 are included in FIGS. 2A–2I.

A variety of monomers may be used to produce the PFCB polymers. Bis- and tris-functionalized TVE monomers polymerize to form linear or network polymers respectively with unique optical, thermal and mechanical properties. Furthermore, accurate control over the polymer properties may be achieved by co-polymerization.

It has been surprisingly discovered in the practice of the invention that compositions formed from structures as shown in FIGS. 1 and 2 may be advantageously used to provide high solids content solutions for coating on substrates in the construction of optical devices, and optical waveguides. High solids content solutions afford the opportunity to build relatively thick films upon the surface of a substrate, which is very desirable in the construction of such devices.

In the practice of one aspect of the invention, it is possible to copolymerize specific comonomers to provide variable and relatively thick core and clad copolymers for waveguide applications such as switches, modulators, attenuators, and the like. Alternatively, mixtures of homopolymer oligomers could be dissolved in a solvent to provide a similar solution, and then coated and cured. By thick, it is meant having a thickness of at least about 0.6 microns. In some applications, a thickness of 1 micron or more may be achieved in only one coat. In other preferred embodiments of the invention, a thickness of at least about 2 microns may be achieved. Thickness levels from 2–10 microns also can be achieved, and in some aspects of the invention, it may be possible to achieve thickness levels well over 10 microns, up to and including at least about 50 microns in some particular embodiments of the invention.

The solution processability of the compositions in the practice of the invention is especially favorable. A reactive copolymer is provided which can be dissolved in very low amounts of solvent so that especially thick coatings can be prepared. The films are then thermally cured (i.e. advanced or polymerized) until they comprise three dimensional "network" polymer. The coatings then may be patterned by lithography or reactive ion etching ("RIE") or such as electron beam methods, or micromolding. In general, the network polymer formed is not soluble and will withstand other processing steps, which is another advantageous feature of the invention. The first layer structures may be coated more than once until a core/clad optical device is formed that is multilayered. High solids content of the copolymer solutions, and a suitable copolymer with appropriate properties, are necessary factors to consider in the practice of the invention.

Monomers shown in FIGS. 2A–2I may be used for optical applications. Bis and tris functionalized TVE monomers polymerize to form linear or network polymers respectively with unique optical, thermal and mechanical properties. Accurate control over polymer properties can be achieved by copolymerization. In addition, methods have been developed that preclude the need for elastomeric negative molds for more cost effective and reproducible prototypes, as further shown below.

PFCB polymers can be prepared neat or in solution at temperatures in excess of 160° C. and do not require initiators or catalysts. The polymerization proceeds via a thermally activated cyclodimerization process. Although free-radical mediated, the cyclo-addition polymerization follows classical step growth kinetics. The polymers can be advanced to precisely controlled viscosity, molecular weight and dispersity by simple heating. The bifunctional TVE monomers yield linear polymers with $M_n$ approaching 100,000 whereas trifunctional monomers can be melt advanced to branched pre-networks and processed prior to final cure. PFCB materials, in general, possess excellent thermal ($T_g$ = 120–350° C.), mechanical and environmental properties providing long-term stability at about 350° C.

The step growth kinetics by which PFCB polymers are formed allows for easy control of parameters important to coating technology. Monomer can be solution advanced at 150 degrees C. in typical solvents known in the art. A precisely controlled viscosity may be achieved, with correct molecular weight and polydispersity. The pre-polymer solution may be spin coated, dip coated, sprayed, or otherwise applied to the substrate by techniques employed in the art of optical device fabrication. Spin coating is known to provide high quality, defect free films. The film typically is cured by baking under nitrogen at temperatures ranging from about 235 degrees to about 325 degrees C. for several hours depending upon the application.

Solids content of solution of PFCB copolymer employed may be from about 10% to about 70%. Films or plaques can be prepared by melt-mixing variable composition monomer mixtures and heating at 150° C.–200° C. under an inert atmosphere.

Figure 2A:
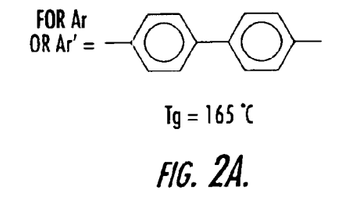
FIGS. 2A–2I depict various groups that may be substituted in a poly-aryl ether having perfluorocyclobutyl linkages as shown in FIG. 1, wherein the Ar and/or Ar' groups would be substituted onto the linkage shown in FIG. 1.
Figure 2B:
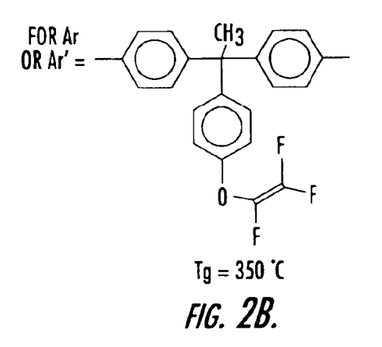
Figure 2C:
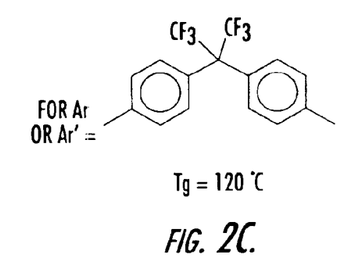
Figure 2D:
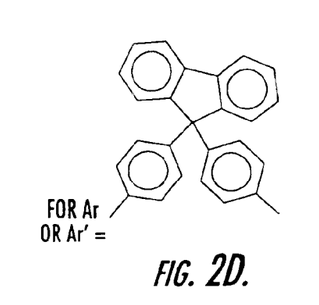
Figure 2E:
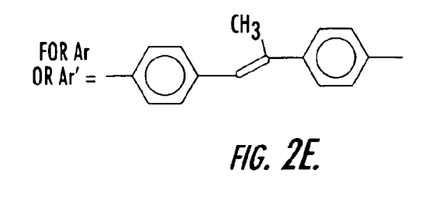
Figure 2F:
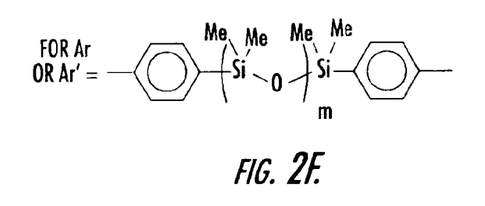
Figure 2G:
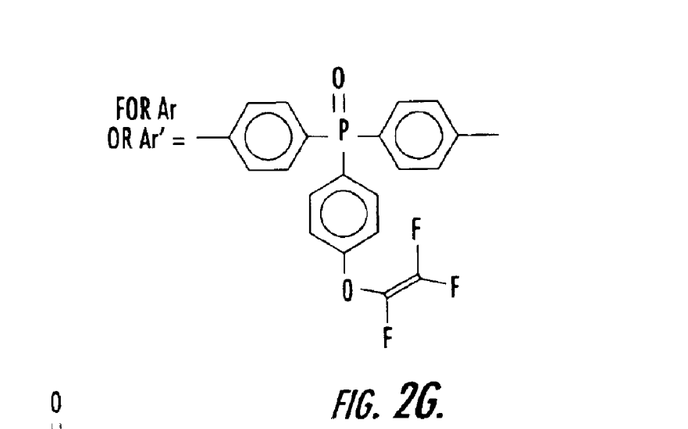
Figure 2H:
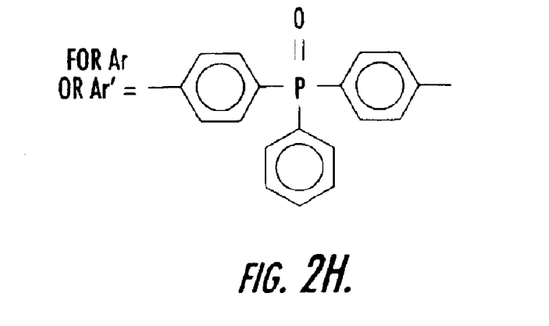
Figure 2I:
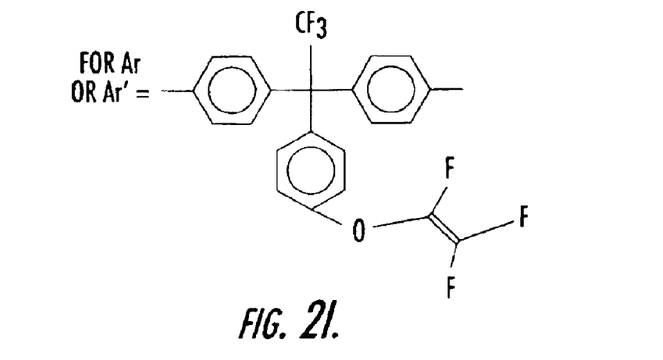

One useful copolymer composition is made by polymerizing the species shown in FIGS. 2A and 2B (50 wt % compositions) which has been known to provide a measured $T_g$=220° C.

Copolymer solutions suitable for spin coating variable thick films may be prepared in mesitylene solution, yet other solvents such as N-methylpyrrolidinone and dimethylsulfoxide also can be used due to the wide ranging and excellent solubility exhibited by trifluorovinyl ether monomers and pre-network copolymer intermediates. For optical device fabrication, many copolymers studied to date contain the trifunctional monomer shown in FIG. 2B so that the advanced intermediate is a branched copolymer of variable conversion and thus molecular weight and viscosity may be controlled prior to thermal cure to a cross-linked network.

For example, copolymer solutions in excess of 80 wt % polymer can be obtained (see Table 1). This enables the preparation of thick films (on the order of 10 $\mu$m) in one spin coat. The ability to spin coat very thick films is a unique feature for high performance PFCB polymers and thereby ensures a homogeneous layer in the final structure versus the multiple spin and cure cycles needed otherwise to achieve the desired thickness.

Figure 3:
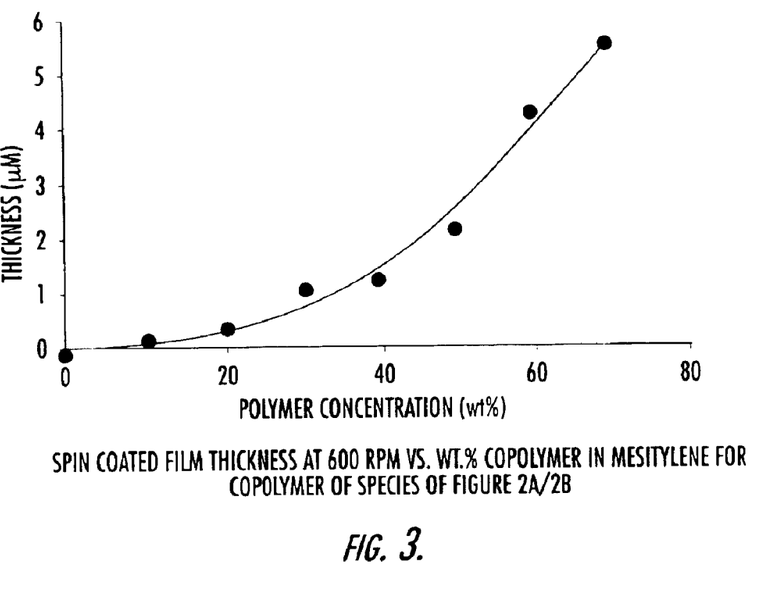
FIG. 3 shows a spin coated thickness versus polymer concentration plot.

FIG. 3 illustrates one spin curve for polymer solutions formed from copolymers utilizing the two monomer species shown in FIGS. 2A/2B, ranging from 10–70 weight percent solids at 600 rpm. The range can be tuned precisely with the expected change with spin rate.

Figure 4:
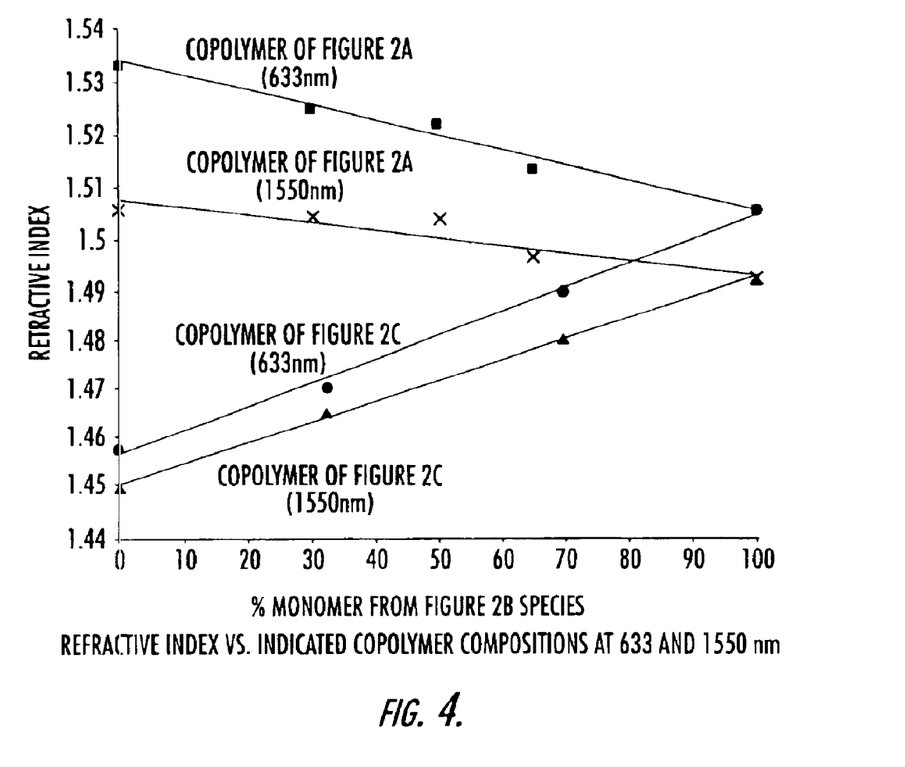
FIG. 4 is a refractive index plot.

FIG. 4 illustrates the refractive index (@ 1550 & 653 nm) tunability for two example copolymers as a function of composition. As shown, a wide range of indices can be obtained through choice of composition.

Process parameters can be precisely controlled by choice of comonomer and polymerization time and temperature. After spin coating, the cyclopolymerization is continued by heating under inert atmosphere to the desired second glass transition temperature ($T_g$). Table 1 illustrates selected conditions and properties for PFCB copolymers targeted for optical applications.

TABLE 1

| Condition or Property | Controlled Range |
| --- | --- |
| Copolymer solution concentration (mesitylene) | Up to 90 wt % |
| Single spin coat thickness | Up to 15 $\mu$m |
| Copolymerization temperature/time | 140–160° C./1–10 h |
| Weight average molecular weight (GPC) | (500–50,000) |
| Molecular weight distribution (GPC) | 1.2–20 $M_w/M_n$ |
| Solution viscosity (RMS) | 0.02–100 Pa s |
| Cure temperature/time | 120–350° C./0.1–3 h |
| Glass Transition Temperature (DSC $T_g$) | 175–350° C. |
| Patterning Technique | Micromolding or RIE |
| Loss at 1550 nm | <0.25 dB/cm |
| Refractive index at 1550 nm | 1.449–1.508 |
| Birefringence | <0.01 |

The attenuation at 1550 nm for select copolymers is lower than that reported in the prior art which used homopolymers of monomer 2B in FIG. 2 instead of copolymers. That is, the use of the monomer in FIG. 2B, is lower due to the decrease of aliphatic groups contained only in that particular species (2B) and the intimate compatibility at the core/clad interface for waveguide structures made solely from PFCB copolymers.

Figure 5:
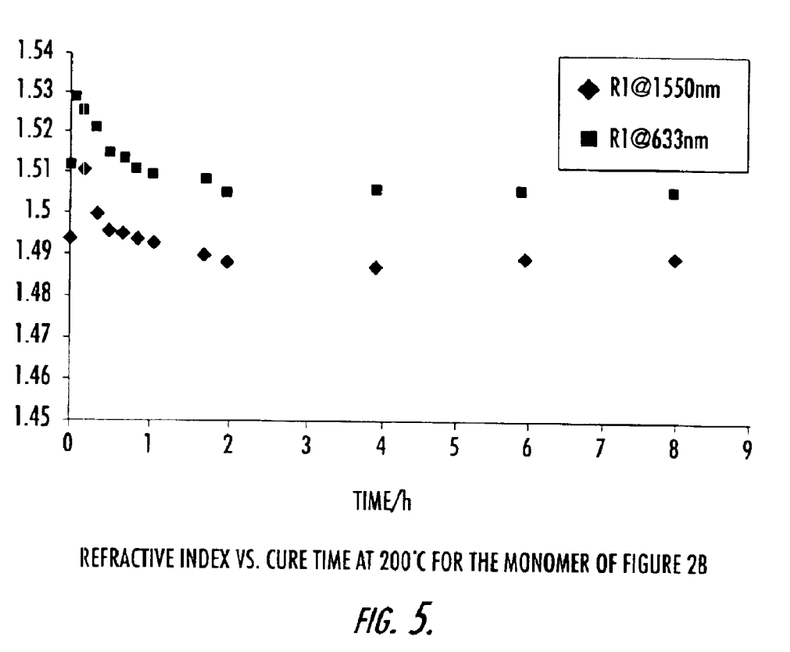
FIG. 5 shows a graph of a refractive index versus cure time curve.

The evolution and stability of optical properties is also of major concern for processing and performance of polymer integrated optics. The stability of the polymer's optical properties over time and during multiple heat and cool cycles is currently a significant issue. Initial results using polymers of the invention are shown in FIG. 5 where the refractive index is plotted as a function of cure time at 200° C. for the monomer of FIG. 2B. As shown, the refractive index changes dramatically during cure yet quickly stabilizes in less than 2 hours. Further, the refractive index is completely stable after multiple heat cure cycles and continued heating at 200° C.

The copolymers of the invention exhibit relatively low loss in the telecommunications wavelength at which they are employed. That is, a low optical loss is observed at about 1550 nm. Loss levels of less than about 0.3, and sometimes less than about 0.1 dB/cm, may be achieved using the compositions and or more, with greater thickness film layers being achieved using greater solids content percentages. Solvents used may be any of the commonly known solvents, including for example, mesitylene. Spin coating is performed by either pouring the solution (less than 10 ml) upon a static silicon wafer (secured by vacuum on the spin coater chuck) and spinning at the desired speed and time (electronically controlled), or pouring the solution on the spinning wager.

General Procedure Experimental Details

Monomers were prepared from their corresponding phenolic precursors. $^1$H NMR data were obtained on a Bruker AC-300 spectrometer. $^{19}$F NMR 188 MHz data were obtained on a Bruker AC-200 spectrometer. Functional group (TVE) conversion data (Table 2) was determined by integration of the TVE fluorine signals and PFCB fluorine signals. Chloroform-d was used as solvent, and chemical shifts reported are internally referenced to tetramethylsilane (0 ppm), CDCl$_3$ (77 ppm), and CFCl$_3$ (0 ppm) for $^1$H, $^{13}$C, and $^{19}$F nuclei, respectively. Infrared analyses were performed on neat oils or free standing films using a Nicolet 550 Magna FTIR spectrophotometer. IR data used for polymerization kinetics was obtained in reflectance mode on an ASI React IR System. Gas chromatography/mass spectrometry (GC/MS) data were obtained from a Varian Saturn GC/MS. Gel permeation chromatography (GPC) data were collected in THF using a Waters 2690 Alliance System with refractive index detection at 35° C., and equipped with two consecutive Polymer Labs PLGel 5 mm Mixed-D and Mixed-E columns. Retention times were calibrated against Polymer Labs Easical PS-2 polystyrene standards. The copolymer solution viscosity was measured with a TA AR1000-N Rheometer. A Geometry of cone-plate was used with a diameter of 40 mm, the 2 degree angle and 43 $\mu$m truncation. The frequency dependence of viscosity was measured within the frequency range of 3.0 to 300.0 rad/s at room temperature. The viscosity data reported here is read at the shear rate of 100.0 rad/s. DSC data were obtained from a Mettler-Toledo 820 System under a nitrogen atmosphere at a scan-rate of 10° C./min.

TABLE 2

Selected Copolymer Data

| Ex. | Monomer (g) | Monomer (g) | wt. % polymer in mesitylenc | Polym. time (h) at 150160 °C. | Mn | Mw | Mw/Mn | Olefin conv. (%) | Viscosity (Pa.s) | *Refractive index @ 1550 nm | *Glass Transition, Tg (° C.) |
|---|---|---|---|---|---|---|---|---|---|---|---|
| 1 | 2B(175) | 0 | 75 | 1.45 | 2444 | 7033 | 2.89 | 34.8 | 0.1 | 1.4883 | 350 |
| 2 | 2B(40) | 2A(40) | 80 | 2.5 | 589 | 1212 | 2.06 | 37.3 | 0.133 | 1.5036 | 225 |
| 3 | 2B(17.38) | 2C(7.78) | 50 | 8 | 1859 | 4656 | 2.5 | 44.2 | 6.8 | 1.4785 | 221 |
| 4 | 2B(17.38) | 2C(7.78) | 76 | 5 | 3943 | 9709 | 2.45 | 52.2 | 1.575 | 1.4801 | 220 |
| 5 | 2B(50) | 2A(50) | 70 | 2.15 | 661 | 1178 | 1.78 | 37 | 1.1 | 1.5008 | 224 |
| 6 | 2B(160) | 2A(40) | 75 | 3.2 | 2508 | 4846 | 1.93 | 40 | 0.1 | 1.4892 | 285 |
| 7 | 2B(80) | 2A(20) | 70 | 1.45 | 899 | 2008 | 2.34 | 32 | 0.085 | 1.4892 | 286 |

*After cure at 200° C. for 2 h.

Copolymer solutions were prepared by dissolving one or more monomers as shown in FIGS. 2A–2B (50–80 wt %) in freshly distilled and filtered mesitylene (5 L flask, ca. 3 L polymer solution). The solution was stirred mechanically and degassed for 30 minutes with a dry nitrogen spurge. The spurge was stopped and a positive pressure of nitrogen was applied and the reaction flask was heated to 150° C. and stirred for several hours to form the copolymers.

The copolymer films were applied to silicon wafers using a KW-4A Spincoater (Chemat Technology, Inc.) using standard spin coating techniques. Filtered polymer solutions were coated from 600 to 2000 rpm for about 60 seconds, and then cured in an oven 200° C. under nitrogen for 2 hours. Alternatively, films could be hot plate cured under nitrogen, in other applications of the invention. Also, the temperature could potentially be increased, or decreased, depending upon the particular application and copolymer employed.

Film thickness was measured by a profilometer, Alphastep 200, which is manufactured by Tencor Company. Refractive index data was obtained from a Metricon Model 2010 Prism Coupler System from Metricon Company. Birefringence was calculated as the difference between the TE mode and the TM mode ($\eta_{TE}-\eta_{TM}$). Absorption spectra were measured using a Perkin Elmer Lambda 900 UV/Vis/NIR spectrophotometer. Spectra were taken over the wavelength range 3200–200 nm at a scan rate of 120 nm/minute.

EXAMPLE 1

Homopolymer of 2B (75 wt % in Mesitylene)

To a three neck round bottom flask equipped with nitrogen inlet, reflux condenser and mechanical stir was added 175 g of pure monomer 2B and 58.3 g of filtered mesitylene. The solution was degassed as described in the general procedures and experimental details above. The clear solution was then heated to 150–160° C. for 1.45 h and allowed to cool. The resulting homopolymer exhibited a olefin conversion of 34.8%, a number average molecular weight (Mn) of 2,444 and a weight average molecular weight (Mw) of 7033, and a molecular weight distribution of 2.89 (See Table 2). The polymer solution was spin coated and cured as described above and gave a thermoset film with refractive index of 1.4883 (at 1550 nm) and a glass transition temperature of 350° C.

EXAMPLE 2

Copolymer of 2B and 2A (50:50 Ratio, 89 wt % in Mesitylene)

To a three neck round bottom flask equipped with nitrogen inlet, reflux condenser and mechanical stir was added 40 g of pure monomer 2B, 40 g of pure monomer 2A, and 10 g of filtered mesitylene. The solution was degassed as described in the general procedures and experimental details above. The clear solution was then heated to 150–160° C. for 2.5 h and allowed to cool. The resulting copolymer exhibited a olefin conversion of 37.3%, a number average molecular weight (Mn) of 589 and a weight average molecular weight (Mw) of 1212, and a molecular weight distribution of 2.06 (See Table 2). The polymer solution was spin coated and cured as described above and gave a thermoset film with refractive index of 1.5036 (at 1550 nm) and a glass transition temperature of 225° C.

EXAMPLE 3

Copolymer of 2B and 2C (70:30 Ratio, 50 wt % in Mesitylene)

To a three neck round bottom flask equipped with nitrogen inlet, reflux condenser and mechanical stir was added 17.4 g of pure monomer 2B, 7.8 g of pure monomer 2C, and 25 g of filtered mesitylene. The solution was degassed as described in the general procedures and experimental details above. The clear solution was then heated to 150–160° C. for 8 h and allowed to cool. The resulting copolymer exhibited a olefin conversion of 44.2%, a number average molecular weight (Mn) of 1859 and a weight average molecular weight (Mw) of 4656, and a molecular weight distribution of 2.5 (See Table 2). The polymer solution was spin coated and cured as described above and gave a thermoset film with refractive index of 1.4785 (at 1550 nm) and a glass transition temperature of 221° C.

EXAMPLE 4

Copolymer of 2B and 2C (70:30 Ratio, 76 wt % in Mesitylene)

To a three neck round bottom flask equipped with nitrogen inlet, reflux condenser and mechanical stir was added 17.4 g of pure monomer 2B, 7.8 g of pure monomer 2C, and 8 g of filtered mesitylene. The solution was degassed as described in the general procedures and experimental details above. The clear solution was then heated to 150–160° C. for 5 h and allowed to cool. The resulting copolymer exhibited a olefin conversion of 52.2%, a number average molecular weight (Mn) of 3943 and a weight average molecular weight (Mw) of 9709, and a molecular weight distribution of 2.45 (See Table 2). The polymer solution was spin coated and cured as described above and gave a thermoset film with refractive index of 1.4801 (at 1550 nm) and a glass transition temperature of 220° C.

EXAMPLE 5

Copolymer of 2B and 2A (50:50 Ratio, 70 wt % in Mesitylene)

To a three neck round bottom flask equipped with nitrogen inlet, reflux condenser and mechanical stir was added 50 g of pure monomer 2B, 50 g of pure monomer 2A, and 43 g of filtered mesitylene. The solution was degassed as described in the general procedures and experimental details above. The clear solution was then heated to 150–160° C. for 2.15 h and allowed to cool. The resulting copolymer exhibited a olefin conversion of 37%, a number average molecular weight (Mn) of 661 and a weight average molecular weight (Mw) of 1178, and a molecular weight distribution of 1.78 (See Table 2). The polymer solution was spin coated and cured as described above and gave a thermoset film with refractive index of 1.5008 (at 1550 nm) and a glass transition temperature of 224° C.

EXAMPLE 6

Copolymer of 2B and 2A (80:20 Ratio, 75 wt % in Mesitylene)

To a three neck round bottom flask equipped with nitrogen inlet, reflux condenser and mechanical stir was added 160 g of pure monomer 2B, 40 g of pure monomer 2A, and 67 g of filtered mesitylene. The solution was degassed as described in the general procedures and experimental details above. The clear solution was then heated to 150–160° C. for 3.2 h and allowed to cool. The resulting copolymer exhibited a olefin conversion of 40%, a number average molecular weight (Mn) of 2508 and a weight average molecular weight (Mw) of 4846, and a molecular weight distribution of 1.93 (See Table 2). The polymer solution was spin coated and cured as described above and gave a thermoset film with refractive index of 1.4892 (at 1550 nm) and a glass transition temperature of 285° C.

EXAMPLE 7

Copolymer of 2B and 2A (80:20 Ratio, 86 wt % in Mesitylene)

To a three neck round bottom flask equipped with nitrogen inlet, reflux condenser and mechanical stir was added 80 g of pure monomer 2B, 40 g of pure monomer 2A, and 20 g of filtered mesitylene. The solution was degassed as described in the general procedures and experimental details above. The clear solution was then heated to 150–160° C. for 1.45 h and allowed to cool. The resulting copolymer exhibited a olefin conversion of 32%, a number average molecular weight (Mn) of 899 and a weight average molecular weight (Mw) of 2008, and a molecular weight distribution of 2.34 (See Table 2). The polymer solution was spin coated and cured as described above and gave a thermoset film with refractive index of 1.4892 (at 1550 nm) and a glass transition temperature of 286° C.

Other solvents besides mesitylene could be used in the practice of the invention, such as other high boiling hydrocarbons, N-methylpyrrolidinone, dimethylsulfoxide, and others. For optical device fabrication, most copolymer intermediates enable molecular weight and viscosity control prior to thermal cure to a cross-linked network.

It is understood by one of ordinary skill in the art that the present discussion is a description of exemplary embodiments only, and is not intended as limiting the broader aspects of the present invention, which broader aspects are embodied in the exemplary constructions. The species shown in FIGS. 2A–2I could be employed in numerous different combinations in the practice of the invention, at various ratios and the like. The invention is shown by example in the appended claims.

What is claimed is:

1. A method of making an optical device, comprising:
   (a) providing a perfluorocyclobutyl-based copolymer composition having a solids content of greater than 50%, (b) coating the perfluorocyclobutyl-based copolymer composition upon a substrate to form a first film, (c) thermally curing the first film to form a thermoset film, in which the thermoset film comprises a substantially transparent polymeric core of an optical waveguide, and (d) coating a second composition on the outer surface of the first film to form a second film, in which the second film is a clad of the optical waveguide.

2. The method of claim 1 wherein the second composition comprises a second perfluorocyclobutyl-based copolymer.

3. The method of claim 1 in which the coating steps are accomplished by spin coating.

4. The method of claim 1 in which the perfluorocyclobutyl-based copolymer composition is applied to the substrate in a solution having at least about 60% solids by weight.

5. The method of claim 1 in which the perfluorocyclobutyl-based copolymer composition is applied to the substrate in a solution having at least about 70% solids by weight.

6. The method of claim 1 in which the cured first film comprises a thickness of at least about 1 micron.

7. The method of claim 1 in which the cured first film comprises a thickness of at least about 2 microns.

8. The method of claim 1 in which the cured first film comprises a thickness of at least about 3 microns.

9. The method of claim 1, wherein the thickness of the thermoset film is between about 10 and about 50 microns.

10. A method of making an optical device, comprising:
   providing a first perfluorocyclobutyl-based copolymer composition,
   spin coating the first perfluorocyclobutyl-based copolymer composition upon a substrate to form a first film, wherein the first film forms a substantially transparent polymeric core,
   providing a second perfluorocyclobutyl-based copolymer composition comprising a second perfluorocyclobutyl-based copolymer different than the first perfluorocyclobutyl-based copolymer, and
   spin coating the second perfluorocyclobutyl-based copolymer composition upon the first film to form a second film, wherein the second film forms a polymeric clad.

11. The method of claim 10, wherein the first film and the second film are each about at least about 10 microns thick.

12. The method of claim 10, wherein the first and second copolymer compositions comprise perfluorocyclobutyl-based copolymers having the structural formula:

wherein Ar does not equal Ar',
wherein z is greater than or equal to 2, and
wherein x and y each are greater than or equal to 1, respectively.

13. The method of claim 12, wherein at least one of Ar or Ar' is a trifluorovinyl aromatic ether.

14. The method of claim 12, wherein the Ar and the Ar' groups each comprise substituted or nonsubstituted aryls selected from the group consisting of:

, and

-continued

15. An optical device constructed by the method of:
(a) providing a perfluorocyclobutyl-based copolymer composition having a solids content of greater than 50%,
(b) spin coating the perfluorocyclobutyl-based copolymer composition upon a substrate to form a first film, wherein the first film forms a core for an optical device having a cured film thickness of at least about 0.6 microns, and
(c) spin coating a second composition on the outer surface of the first film to form a second film, in which the second film is a clad of the optical device.

16. The optical device of claim 15, wherein the second film comprises a second thermoset perfluorocyclobutyl-based copolymer, wherein the second film is a clad for the optical device having a cured film thickness of at least about 0.6 microns.

17. The optical device of claim 16, wherein the first film and the second film each have a thickness of at least about 5 microns.

18. The optical device of claim 16, wherein the first film and the second film each have a thickness of at least about 10 microns.

19. The optical device of claim 16, wherein the first film and the second film each have a thickness between about 10 and about 50 microns.

* * * * *

UNITED STATES PATENT AND TRADEMARK OFFICE
CERTIFICATE OF CORRECTION

PATENT NO. : 6,953,653 B2  
DATED : October 11, 2005  
INVENTOR(S) : Dennis W. Smith et al.

Page 1 of 1

It is certified that error appears in the above-identified patent and that said Letters Patent is hereby corrected as shown below:

Column 12,
Line 10, "  " should be --  --.

Column 13,
Line 1, "  " should be --  --.

Signed and Sealed this

Thirty-first Day of January, 2006

JON W. DUDAS  
*Director of the United States Patent and Trademark Office*